Figure 1:
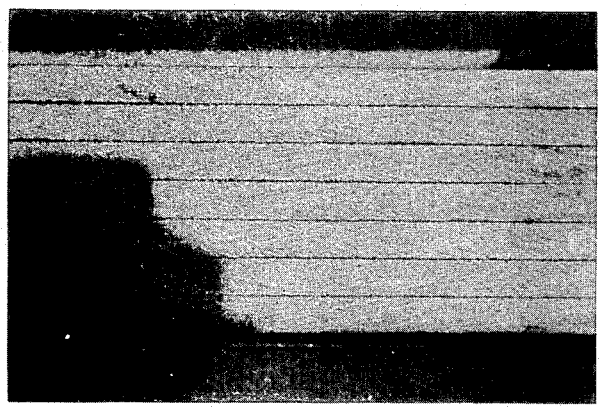

United States Patent [19]
Akiyoshi et al.

[11] 3,888,712
[45] June 10, 1975

[54] METHOD FOR PRODUCING FIBERGLASS REINFORCED PLASTIC COMPOSITE PIPES

[75] Inventors: Katsumi Akiyoshi; Yukimasa Terui; Hitoshi Kirigaya; Haruo Koyama, all of Tokyo, Japan

[73] Assignee: Bridgestone Tire Company Ltd., Tokyo, Japan

[22] Filed: Feb. 15, 1973

[21] Appl. No.: 332,758

[30] Foreign Application Priority Data
Feb. 22, 1972 Japan.............................. 47-17725
Feb. 22, 1972 Japan.............................. 47-17726
June 22, 1972 Japan.............................. 47-62719

[52] U.S. Cl. ............... 156/171; 156/172; 156/173; 156/187; 156/195; 156/244; 156/332
[51] Int. Cl. ...................... B65h 81/02; B65h 81/06
[58] Field of Search ........... 156/171, 172, 173, 187, 156/332, 244, 195

[56] References Cited
UNITED STATES PATENTS
3,520,749   7/1970   Rubenstein ........................ 156/173
3,706,615   12/1972  Nishiyama ......................... 156/173
R27,144     6/1971   Rubenstein ........................ 156/171

*Primary Examiner*—Daniel J. Fritsch
*Attorney, Agent, or Firm*—Stevens, Davis, Miller & Mosher

[57] ABSTRACT

Fiberglass reinforced plastic sandwich pipes are produced by using glass fiber threads, a thermosetting resin and a resin concrete by an already known filament winding process. The inner and outer tubes are formed of glass fiber threads impregnated with a thermosetting resin by filament winding process and the core layer is formed of a resin concrete sheet obtained by blending 100 parts of an unsaturated polyester resin, 0.5-10 parts of an inorganic thickener, 100-900 parts of a filler, 0-30 parts of a diluting agent, 0.1-5 parts of a cross-linking agent and 0-5 parts of a cross-linking accelerator and treating the resulting mixture at a temperature of 10-60°C to thickner the mixture and extrusion-molding the thickened mixture into a sheet.

11 Claims, 3 Drawing Figures

METHOD FOR PRODUCING FIBERGLASS REINFORCED PLASTIC COMPOSITE PIPES

The present invention relates to a method for producing fiberglass reinforced plastic composite pipes by using an improved resin concerte sheet and more particularly to a method for producing fiberglass reinforced plastic composite pipes which comprises winding glass fiber threads impregnated with a thermosetting resin around a mandrel to form an inner tube, winding on said inner tube a resin concrete sheet obtained by blending 100 parts of an unsaturated polyester resin with 0.5–10 parts of an inorganic thickener, 100–900 parts of a filler, 0–30 parts of a diluting agent, 0.1–5 parts of a cross-linking agent and 0–5 parts of a cross-linking accelerator, thickening the resulting mixture at a temperature of 10°–60°C to form a rubbery material, and then forming the rubbery material into a sheet in a required thickness, and then winding glass fiber threads impregnated with a thermosetting resin thereon to form an outer tube.

The conventional fiberglass reinforced plastic pipes have been mostly formed only from a resin layer but recently the demand of pipes having a large diameter or pressure pipes increases and consequently pipes having a high strength, that is having a sufficiently large thickness to satisfy such requirements have been required. In this case, the formation of pipes having a large thickness only by a resin layer makes the cost high and further the weight of the pipe itself becomes extremely large and therefore the transport and the instituting working become difficult.

In order to solve these problems, the use of sandwich type composite pipes manufactured by making the inner wall and the outer wall of fiberglass reniforced plastic and forming the intermediate layer (core layer) by using an inexpensive and light resin concrete containing a filler as a main component, has been increased.

The resin concrete as mentioned above is generally composed of a resin, a filler, such as sand, a diluting agent, a cross-linking agent and the like and this resin concrete is a fluid liquid or a mixture of a sandy material and fluid. When such a resin concrete is used for the core layer, a centrifugal process or casting processes as explained hereinafter have been adopted.

Namely, a pipe having a larger diameter and a pipe having a smaller diameter are firstly manufactured by means of fiberglass reinforced plastic and these pipes are arranged on a coaxial relation and then the resin concrete as mentioned above is casted between the inner and outer pipes and then cured to form an intermediate layer (core).

The other process is as follows.

An inner tube is firstly formed on a mandrel of a molding machine of fiberglass reinforced plastic pipe and then a molding frame is arranged surrounding the inner tube and then a resin concrete paste is supplied between the inner tube and the molding frame by an extruder and then the resin concrete is cured in a curing oven, after which an outer tube is formed on the core layer by a filament winding process.

Accordingly, the installations in these conventional processes need a centrifugal molding apparatus, a molding frame, an intermediate curing oven and the like and further the molding processes are complicated and need a long time. Moreover, the molded product contains trapped air in the core layer and therefore there is a great problem in view of the strength of the resulting composite pipe and the productivity.

The present invention is to provide an improved and novel method for producing composite pipes in a high efficiency.

The inventors have found that when the conventional resin concrete of a fluid liquid state or a sandy state is rendered to be a particular composition ratio and an inorganic thickener, such as magnesium oxide is added thereto and the resulting mixture is thickened under a proper condition, said resin concrete becomes a rubbery state, which can be extruded into a sheet by an extruder or rolls usually used in rubber industry field and the present invention has been accomplished.

The resin concrete sheet obtained by molding the thickened resin concrete into a sheet is more dense and has a larger specific gravity and is much less in trapped air than the product obtained by the conventional fluid resin concrete and has the following various merits.

1. The resin concrete sheet itself shows an elastic rubbery state and directly can be wound around an inner tube previously formed on a mandrel to form a core layer of resin concrete.

Namely, even if a force necessary for the winding is applied to the resin concrete sheet, said sheet has an elasticity and can be wound without hindrance.

Accordingly, the resin concrete sheet is much more easy in the handling in the molding process than the conventional fluid resin concrete.

2. The thickness of resin concrete layer in the composite pipe can be varied optionally by the thickness of the resin concrete sheet and the number of winding turns.

As the result, the present invention has the following various features as compared with the conventional method of producing composite pipes.

a. It has been publicly known that an intermediate layer is formed by falling a filler on a resin layer coated on an inner tube, but it is impossible in this process to form a satisfactory thick layer.

b. It can be considered that a resin concrete composition is applied directly on a cloth and the resin concrete coated cloth is wound on an inner tube as an intermediate layer, but it is impossible in this process to obtain a molding having a required thickness and in order to obtain a necessary thickness it is necessary to wind said resin concrete coated cloth in several layers.

c. In the casting process which uses a mold frame, the thickness is defined by the apparatus to be used.

d. It is possible to interpose a resin layer between the resin concrete layers in a sandwich form.

Particularly, the merit of the present invention consists in that a composite pipe having an intermediate layer having a thickness of about 10–40 mm can be obtained very easily and efficiently.

3. Since the resin concrete sheet of the present invention has been thickened, said sheet has a solid form even after the winding and when said sheet is wound around the inner tube, the deformation does not substantially occur and uniform composite pipes can be formed. Consequently, the strength is satisfactorily high.

4. After the resin concrete sheet has been wound around the inner tube, it is not necessary to effect the curing prior to formation of the outer tube and therefore the installations and the production time can be considerably decreased. This has a remarkable merit as compared with the casting process, centrifugal mold process and the like.

5. The resin concrete sheet according to the present invention makes a continuous production process possible and an efficient production can be attained.

6. The trapped air in the molded product according to the method of the present invention is not substantially present and it is possible to produce the uniform product. The resin concrete itself is dense and has a high specific gravity and therefore the strength of the product of the present invention is higher than the conventional product.

The resin concrete sheet according to the present invention may be used for molding of the composite pipe directly after the formation of sheet and alternatively a woven fabric or a non-woven fabric may be used as a support after the molding of sheet.

Namely, the components of the resin concrete are blended and the resulting mixture is thickened and then extruded on a woven fabric or a non-woven fabric when the thickened mixture is molded into a sheet and the resulting resin concrete sheet as it is or after the fabric is removed, may be wound around the inner tube.

Furthermore, it is possible to effect the following means. That is, the components of the resin concrete are blended and the resulting mixture is coated on a sheet-shaped woven fabric or non-woven fabric and then the resin concrete is thickened on the fabric and then molded, after which the resin concrete sheet provided with the fabric is wound on the inner tube. However, the use of such fabric is not essential in the formation of the resin concrete sheet and said fabric is an auxiliary material and it is not necessary to use an expensive material having a high tension as the fabric.

An explanation will be made with respect to each component to be used in the present invention and the method of the present invention in detail.

The inner tube and the outer tube (skin layer) of the composite pipe are composed of glass fiber threads, thermosetting resin and additives and formed by a filament winding process. 81

The thermosetting resin to be used herein is selected from unsaturated polyester resins, epoxy resins, phenolic resins, urethane resins and vinyl ester resins. Among them, unsaturated polyester resins and epoxy resins are preferable. These resins may be the same as or different from the resins to be used in the resin concrete. Particularly, in the case of production of corrosion resistant composite pipes, a corrosion resistant resin is used for the skin layer. As the additives, fillers, diluting agents, cross-linking agents, cross-linking accelerators and retarders to be used as the components of the resin concrete as mentioned hereinafter are selected properly.

Concerning the composition of the resin concrete, various compositions may be considered but the resin concrete of the present invention comprises various unsaturated polyesters, fillers, thickeners, diluting agents, cross-linking agents (hardening agents), accelerators, retarders and the like but since the resin concrete of the present invention is different from the conventional fluid resin concrete and is formed into a sheet, a specific device is made.

The unsaturated polyester resin to be used herein is selected from orthophthalic acid series polyester resins, isophthalic acid series polyester resins and bisphenolic A series polyesters.

As the fillers, use may be made of organic and inorganic fillers for general rubbers and plastics, for example, calcium carbonate, clay, talc, asbestos, silicate minerals, natural silicate, alumina hydrate, barium sulfate, calcium sulfate, metal powder, aluminum stearate, zinc stearate, cement, urea-formaldehyde resin, urea-phenolic resin, melamineformaldehyde resin, saw powder, celluloses, carbon black, glass fiber and the like. Among them, when aluminum stearate or zinc stearate is mixed in an amount of 5–50% by weight based on the total amount of the filler, the strength of the resulting resin concrete sheet increases and the molding of the resin concrete sheet becomes easy.

The following inorganic thickeners act an important function for obtaining the sheet-shaped resin concrete. These thickeners include magnesium oxide, calcium oxide, calcium hydroxide, beryllium oxide, cement and the mixtures thereof.

In the conventional resin concretes, the thickeners have not been particularly added. However, the addition of the thickeners and a thickening treatment as mentioned hereinafter are essential for the formation of the sheet according to the present invention.

As the diluting agents, use may be made of such substances that have compatibility with the above mentioned unsaturated polyester resins and are easily given the reactivity by the following cross-linking agents and react with the unsaturated polyester resin to serve the curing. Namely, the diluting agents are selected from the compounds which are activated by usual vinyl monomers or organic peroxides. For example, these diluting agents are monomers, such as styrene, chlorostyrene, methyl methacrylate, ethyl methacrylate, butyl methacrylate, methyl acrylate, ethyl acrylate, butyl acrylate and the like, styrene-acrylonitrile copolymer, vinyl chloride-vinyl acetate copolymer, cellulose acetate butyrate, cellulose acetate propionate and the like. Among them, styrene, derivatives, acrylic acid esters, metharcylic acid esters are preferable and particularly, styrene, butyl acrylate, methyl acrylate are preferable. These diluting agents may be used or not be used in the resin concrete composition.

As the cross-linking agents, usual organic peroxides are used. That is, ketone peroxide, hydroperoxide, dialkyl peroxide, diacyl peroxide, peroxyesters are generally used.

Furthermore, accelerators to promote the curing reaction and retarders to restrain the curing reaction for maintaining the processability favorably prior to the curing reaction may often be used. As the accelerators, cobalt series accelerators, such as cobalt naphthenate, vanadium series accelerators, such as vanadium pentoxide, manganese series accelerators, tertiary amine series accelerators, quaternary ammonium salts, mercaptans may be used. These accelerators may not be used depending upon the use object.

As the retarders, use may be made of quinones, hydroquinones, organic and inorganic copper salts, amidines, hydrazine salts, quaternary ammonium salts, amines, nitro compounds, oximes, sulfur, polyhydric phenols, amine hydrochloride and the like.

The composition ratio of these additives is 100–900 parts, preferably 200–500 parts of filler, 0.5–10 parts of thickener, 0–20 parts of diluting agent, and 0.1–5 parts of cross-linking agent based on 100 parts of the unsaturated polyester resin and the accelerator and retarder are added in proper amounts depending upon the above described composition ratio, the cross-linking agent, the amount thereof and the object.

An explanation will be made with respect to the thickening treatment having an important function for the formation of the resin concrete sheet of the present invention.

The thickening treatment must be effected at least in the presence of the unsaturated polyester resin, the above described inorganic thickener and the cross-linking agent. Namely, the thickening treatment may be effected after all the components of the resin concrete as mentioned above are blended or the unsaturated polyester resin, the inorganic thickener and the cross-linking agent are mixed and then the resulting mixture is thickened, after which the filler, the diluting agent and the like are added thereto. In the latter process, since the accelerator can be added after the thickening treatment is effected, the curing may be made at room temperature and the kneading process is effected after the thickening treatment, the processability is favorable.

The blending may be effected by using rolls, kneader and the like.

After the resin concrete consisting of the above described components is kneaded, the resulting mixture is aged in a proper apparatus, for example, a curing oven or a heating chamber at a temperature of 10°–60°C to increase the viscosity (thicken). At a temperature lower than 10°C, it is difficult to increase the viscosity and at a temperature higher than 60°C, the cross-linking too proceeds and the after-processability lowers and such temperatures are not preferable.

The degree of thickening and the conditions therefor influence the processability of the after-treatment and are adjusted properly by time, temperature, composition of the resin, the kind and amount of cross-linking agent, accelerator and thickener, but the time is usually within 48 hours.

The thus thickened resin concrete is molded into a resin concrete sheet having an optional thickness and breadth by a molding machine, for example, an extruder, calender rolls, rolls and the like.

The thus molded resin concrete sheet is a rubber sheet-shaped solid different from the conventional fluid resin concrete and has a sufficient strength to endure the molding operation without being reinforced with a substrate.

Furthermore, it is possible to mold into a desired thickness and since the resin concrete is subjected to an extrusion molding after said resin concrete has been thickened, the resin concrete sheet has substantially no trapped air. Moreover, since the molded product after thickening is a rubbery state, the processability is good.

The resin concrete sheet of the present invention not only can form the core layer of the fiberglass reinforced plastic composite pipes but also can be used for press molded products, such as corrosion resistant floorings, artificial marble, unfreezing roofing tiles and the like.

Figure 2:
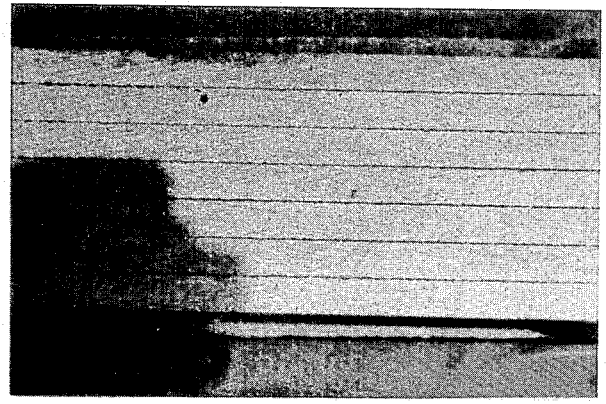
Figure 3:
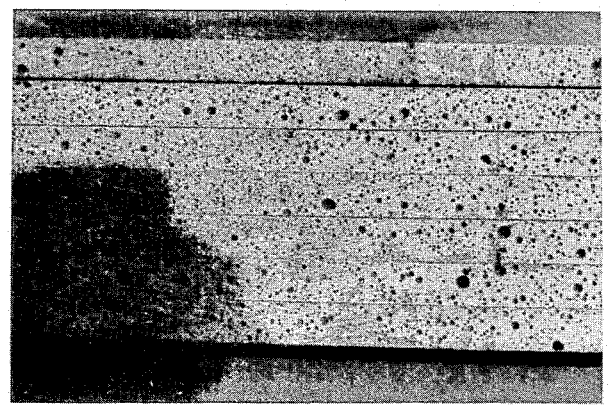

For a better understanding of the present invention, reference is taken to the accompanying drawings, wherein:

FIGS. 1 and 2 show cross-sections of the resin concrete plates obtained by the method of the present invention which are piled; and FIG. 3 shows a cross-section of resin concrete plates obtained by a conventional method which are piled.

The following examples are given for the purpose of illustration of this invention and are not intended as limitations thereof.

"Part" used herein means "by weight".

EXAMPLE 1

100 parts of unsaturated polyester resin (a mixture of 90 parts of Rigolac 1557 (trade mark), 10 parts of Rigolac 70F (trade mark)), 2 parts of magnesium oxide as a thickener (Kyowa Mag. No. 40 (trade mark)) and 1 part of benzoyl peroxide as a cross-linking agent were blended and then 10 parts of styrene as a diluting agent, 42 parts of calcium carbonate, 258 parts of siliceous sand No. 8 and 10 parts of aluminum stearate as a filler were mixed therewith by a kneader and the resulting mixture was thickened at 40°C for 20 hours. The resulting mixture after the thickening showed a rubbery state, which was formed into a sheet having a breadth of 200 mm and a thickness of 10 mm by an extruder. This sheet was suitable for molding of a sandwich pipe and for the production of plate by a press molding.

EXAMPLE 2

100 parts of unsaturated polyester resin (a mixture of 90 parts of Rigolac 1557 (trade mark) and 10 parts of Rigolac 70F (trade mark)), 2 parts of magnesium oxide (Kyowa Mag. No. 150 (trade mark)) as a thickener and 1 part of benzoyl peroxide as a cross-linking agent were blended and the resulting mixture was thickened at 40°C for 15 hours. Then 10 parts of styrene as a diluting agent, 42 parts of calcium carbonate, 258 parts of siliceous sand No. 8 and 10 parts of aluminum stearate as a filler and 0.14 part of dimethyl aniline as an accelerator were added thereto by a kneader and the resulting mixture was formed into a sheet having a breadth of 200 mm and a thickness of 10 mm by an extruder. This sheet was hardened at room temperature. This sheet was suitable for an intermediate layer of a sandwich pipe and for the production of plate by a press molding and had a very good processability.

EXAMPLE 3

Resin concrete sheets were prepared by using the resin and additives having the same composition as in Example 2 but a varying the thickening process and the compounding process of the additives and from each resin concrete sheet a plate was prepared and the bending strength and the specific gravity of said plate were measured.

A resin concrete sheet was prepared by using the resin and additives having the same composition as in Example 2 without effecting the thickening treatment as in the conventional process and a plate was prepared therefrom and was determined with respect to the physical properties and appearance.

Experiment 1 was made in the quite same manner as described in Example 2. That is, the polyester resin, the thickener and the cross-linking agent were mixed and the resulting mixture was subjected to the thickening treatment and then the diluting agent and the filler were added thereto and the mixture was formed into a sheet by an extruder.

In Experiment 2, to the polyester resin were added all the thickener, the cross-linking agent, the diluting agent and the filler and then the resulting mixture was subjected to the thickening treatment and then formed into a sheet.

Each of the formed sheets was subjected to a press molding to form a plate.

In Experiment 3 the resin and additives having the same composition as in Experiment 2 were used and from the resulting mixture a resin concrete plate was prepared in a conventional manner without effecting the thickening treatment. The obtained results are shown in the following Table.

| Experiment No. | Bending strength ($Kg/mm^2$) | Specific gravity ($g/cm^3$) | Appearance (Trapped air) |
|---|---|---|---|
| 1 | 3.75 | 1.929 | Substantially no |
| 2 | 4.33 | 1.987 | Substantially no |
| 3 (control) | 2.74 | 1.741 | Many |

The bending strength was tested following to JIS K 6911-5.17 by means of Instron tester and the appearances of the resin concrete plates of Experiments 1, 2 and 3 are shown in FIGS. 1, 2 and 3 of the photographs 1, 2 and 3, respectively.

As seen from the above results, the plates obtained in Experiments 1 and 2 of the method of the present invention are more excellent in the bending strength than the plate obtained in Experiment 3 of the conventional process and from the measured values of the specific gravity and the appearances, it is apparent tha the amount of the trapped air in the plates in Experiments 1 and 2 is far less than that in the plate in Experiment 3.

EXAMPLE 4

100 parts of an unsaturated polyester resin (orthophthalic acid resin, a mixture of 80 parts of Polylite BS 11 (trade mark) and 20 parts of Polylite BS 90 (trade mark)), 2.5 parts of magnesium oxide (Kyowa Mag. No. 150 (trade mark)) as a thickener, 6.25 parts of styrene as a diluting agent and 1 part of benzoyl peroxide as a cross-linking agent were blended and then 42 parts of calcium carbonate, 258 parts of siliceous sand No. 8 and 10 parts of aluminum stearate as a filler were mixed therewith by means of a kneader at 50°C for 30 minutes to thicken the mixture. The resulting mixture was able to be easily molded by an extruder into a sheet as in Examples 1 and 2.

EXAMPLE 5

By means of an E 4 type filament winding machine made by Drostholm Prod. A/S, a fiberglass reinforced plastic composite pipe having a diameter of 1,200$\phi$ was prepared as in the following manner.

1. Composition of a skin layer resin.

| | |
|---|---|
| Orthophthalic acid series polyester resin | 100 parts |
| Cyclohexanone peroxide (cross-linking agent) | 1.3 parts |
| Cobalt naphthenate styrene (accelerator) | 0.5 part |
| NLC-10 (made by Kayaku Noury Co., Ltd., retarder) | 0.15 part |

2. Composition of resin concrete, thickening treatment. 100 parts of orthophthalic acid series polyester resin, 250 parts of siliceous sand (No. 8), 50 parts of calcium carbonate and 10 parts of aluminum stearate as a filler, 2.5 parts of a highly active magnesium oxide as a thickener, 1.0 part of benzoyl peroxide as a cross-linking agent, 2.0 parts of RS 436 (made by Dainihon Ink Co., Ltd.) as a retarder and 3.0 parts of glass chops were blended in a kneader having 100 l capacity and the resulting mixture was thickened at a temperature of 15°–20°C for about 10 minutes.

3. Molding of composite pipe.

I. A cellophane was wound around a mandrel as a releasing material.

II. A glass roving (60 ends) impregnated with the skin layer resin prepared in the above item (1) was wound around the cellophane by a filament winding process to form an inner tube having a thickness of 2.5 mm.

III. On the inner tube formed in the above item (II), a resin concrete sheet obtained by extruding the resin concrete prepared in the above item (2) by two axis extruder (provided with an orifice having a thickness of 15 mm and a breadth of 80 mm) at an extrusion rate of about 300 m/hr, was wound at a rotating velocity of the mandrel.

IV. A glass roving impregnated with the skin layer resin prepared in the above item (1) was wound thereon by a filament winding process to form an outer tube having a thickness of 2.5 mm.

V. The resulting assembly was placed in a curing oven to cure the resins.

The cross-section of the thus molded fiberglass reinforced plastic composite pipe consisted of skin layers and a core layer having uniform thickness and the core layer was a dense resin concrete layer and no air was trapped. When by the above described process, ten composite pipes each having a length of 10 m were continuously produced, homogeneous pipes were able to be produced in a high efficiency and any pipe had no drawbacks.

Then, the strength test of the thus molded composite pipes was made by means of Amsler tensile testing machine of 50 tons. As the test sample, the above pipe was cut in a breadth of 30 cm.

| | |
|---|---|
| Compression strength: | 11,000 Kg/m |
| Deflection in radial direction: | 40 cm |

EXAMPLE 6

In the same manner as described in Example 5, a fiberglass reinforced plastic composite pipe was prepared, provided that bisphenolic series polyester resin was used instead of orthophthalic acid series polyester resin as the skin layer resin and the resin concrete sheet was same as in Example 5.

The thus molded composite pipe showed a high strength and an excellent corrosion resistance.

What is claimed is:

1. A method for producing fiber glass reinforced plastic composite pipes comprising the steps of
    winding glass fiber threads impregnated with a thermosetting resin on a mandrel to form an inner tube,
    applying a resinous concrete to said inner tube and of
    again winding glass fiber threads impregnated with a thermosetting resin, said layer thus forming an outer layer, characterized in that the intermediate layer is formed by winding a sheet consisting of a resinous concrete, said sheet being prepared by thickening a mixture of a. 100 parts of an unsaturated polyester resin,
b. 0.5 to 10 parts of an inorganic thickener selected from the group consisting of magnesium oxide, calcium oxide, calcium hydroxide, beryllium oxide and mixture thereof,
c. 0.1 to 5 parts of a cross-linking agent,
d. 0 to 5 parts of a cross-linking accelerator,
e. 100 to 900 parts of a filler, and
f. 0 to 30 parts of a diluting agent at a temperature of 10° to 60°C and extruding the thickened mixture into the sheet.

2. A method as claimed in claim 1, wherein said thermosetting resin is selected from the group consisting of unsaturated polyester resins, epoxy resins, phenolic resins, urethane resins and vinylester resins.

3. A method as claimed in claim 1, wherein said unsaturated polyester resin is selected from the group consisting of orthophthalic acid series polyester resin, isophthalic acid series polyester resin and bisphenolic polyester resin.

4. A method as claimed in claim 1, wherein said filler is selected from the group consisting of calcium carbonate, clay, talc, asbestos, silicate mineral, natural silicate, alumina hydrate, barium sulfate, calcium sulfate, metal powder, aluminum stearate, zinc stearate, cement, urea-formaldehyde resin, urea-phenolic resin, melamineformaldehyde resin, saw powder, celluloses, carbon black and glass fiber.

5. A method as claimed in claim 1, wherein said diluting agent is selected from the group consisting of styrene derivatives, acrylates, and methacrylates.

6. A method as claimed in claim 5, wherein said diluting agent is selected from the group consisting of styrene, methyl methacrylate and butyl methacrylate.

7. A method as claimed in claim 1, wherein said cross-linking agent is selected from the group consisting of ketone peroxide, hydroperoxide, dialkyl peroxide, diacyl peroxide and peroxyester.

8. A method as claimed in claim 1, wherein said cross-linking accelerator is selected from the group consisting of cobalt series accelerators, vanadium series accelerators, magnanese series accelerators, tertiary amine series accelerators, quaternary ammonium salts, and mercaptans.

9. A method as claimed in claim 1, wherein said resinous concrete sheet is obtained by blending the unsaturated polyester resin, the inorganic thickener, the cross-linking agent, the filler, the diluting agent and the cross-linking accelerator and thickening the resulting mixture and subjecting the thickened mixture to an extrusion molding.

10. A method as claimed in claim 1, wherein said resinous concrete sheet is obtained by blending the unsaturated polyester, the inorganic thickener and the cross-linking agent, thickening the resulting mixture, blending the filler, the diluting agent and the cross-linking accelerator to the thickened mixture and subjecting the resulting mixture too an extrusion molding.

11. A method as claimed in claim 1, wherein the resinous concrete is thickened and extrusion-molded into a sheet on a supporter of a woven fabric or a nonwoven fabric and the resinous concrete sheet supported on the fabric is wound on the inner wall.

* * * * *